United States Patent Office 2,789,061
Patented Apr. 16, 1957

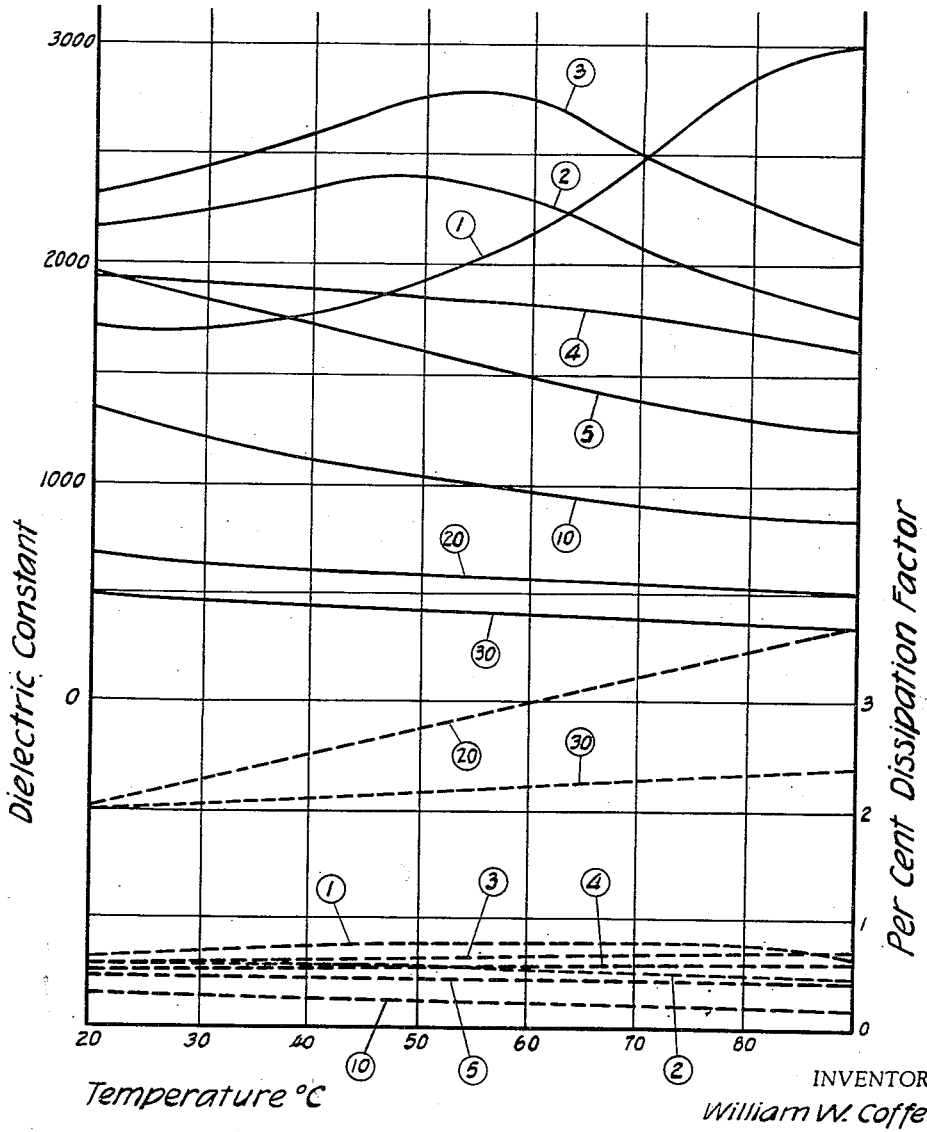

2,789,061

BARIUM TITANATE CERAMIC DIELECTRICS

William W. Coffeen, Westfield, N. J., assignor to Metal & Thermit Corporation, New York, N. Y., a corporation of New Jersey Application July 31, 1953, Serial No. 371,658

3 Claims. (Cl. 106—39)

This invention relates to ceramic dielectrics.

It is a primary object of the invention to produce a ceramic dielectric of relatively high dielectric constant having reasonable stability with variations in temperature and low dissipation factor.

It is known that barium titanate alone has a dielectric constant of about 1400 and a dissipation factor of about one percent at 25° C. and one kilocycle. The dielectric constant of barium titanate varies a total of about 10% over the temperature range from 25° C. to 85° C. Also, the useful life of pure barium titanate capacitors is very short and additivies are needed which will increase the uesful life. In accordance with the invention dielectrics are produced in which the dielectric constant is increased, and the dissipation factor is reduced, while the temperature stability of the dielectric constant is not seriously impaired, and in some instances is even improved, and the useful life is extended.

I have found that these results can be realized by combining barium titanate with nickel stannate to produce ceramic bodies. The dielectric properties of bodies of this invention are shown in Figure 1. For example, a body containing 2 mole percent nickel stannate has a dielectric constant of about 2200, and a dissipation factor of about 0.6% at 25° C. and one kilocycle. The dielectric constant of such a body shows a total variation with temperature of 25% or less.

A range of 99 mole percent barium titanate with one mole percent nickel stannate to 85 mole percent barium titanate with 15 mole percent nickel stannate has been found operative and useful, but the range of 98 mole percent barium titanate with 2 mole percent nickel stannate to 96 mole percent barium titanate with 4 mole percent nickel stannate has been found to be most consistently advantageous and is therefore preferred.

The following procedure is described by way of illustration as one which has been successfully employed in the manufacture of practically useful ceramic dielectric bodies within the invention.

A batch consisting of 0.68 gram of hydrated nickel stannate (approximately $NiSnO_3.2H_2O$) and 19.32 grams barium titanate (97 mole percent $BaTiO_3$+3 mole percent $NiSnO_3$) was weighed out and slurried with 50 cc. of distilled water. The slurry was dried, pulverized to pass a 50 mesh screen, moistened with 5% of a 2½% starch solution and pressed into a single slug for calcining. After calcining one hour at 1600° F. the calcine was ground to pass a 325 mesh screen and again moistened with starch solution. Small discs three-eighths inch in diameter and about one-tenth inch thick were pressed at a pressure twenty thousand pounds per square inch. These discs were fired on platinum foil at 2400° F. for one hour. They were found to have zero absorption. The discs were silvered by the application of a silver paint to both faces and subsequent firing at 1350° F. for one hour. Tinned copper lead wires were soldered directly to the silver electrodes. After aging for at least one week, measurements of dielectric constant and dissipation factor were made over the temperature range from 25° C. to 85° C. The dielectric constant of the discs averaged 2380, and the dissipation factor 0.58%. The dielectric constant was found to have a maximum rise of 17% above its value at 25° C. and maximum decrease of 7% below that value as the temperature rose from 25° C. to 85° C.

I have found that magnesium zirconate and magnesium stannate act similarly to nickel stannate, but that nickel stannate has the advantage over the magnesium compounds that it is not susceptible to grain growth difficulties in firing which are often encountered with the magnesium compounds.

Like the magnesium compounds above, nickel stannate can also be used in conjunction with other additives, which can be termed "shifters," by virtue of their "shifting" effects on the Curie temperature of barium titanate. The term "shifters" as used herein includes the following additives:

Shifters $BaSnO_3$
$SrSnO_3$
$CaSnO_3$
$PbSnO_3$
$ZnSnO_3$
$BaZrO_3$
$CaZrO_3$
$SrZrO_3$
$SrTiO_3$ The effect of a "shifter" type additive is generally to lower the Curie peak temperature (the temperature at which the dielectric constant is highest). As the percentage of shifter is increased, the Curie peak temperature is progressively lowered. This downward shift is sometimes accompanied by a broadening of the peak and a change in the peak value of the dielectric constant.

Bodies containing only "shifter" type additives are normally characterized by very high levels of dielectric constant (up to 10,000) with very large fluctuations in their value as a function of temperature. Relatively high dissipation factors also normally accompany these characteristics. The use of nickel stannate in addition to the "shifter" type additives to barium titanate can produce bodies of fairly high dielectric constant (3000 to 6000) having much less variation with temperature and with lower dissipation factors than those bodies containing only barium titanate plus a "shifter" type additive.

Useful ceramic dielectrics may be produced by the combination of up to 15 mole percent of any one or more of the above listed shifters with one-tenth to ten mole percent nickel stannate and the remainter barium titanate.

What is claimed is:

1. A ceramic dielectric body consisting of 99 to 85 mole percent barium titanate and 1 to 15 mole percent nickel stannate.

2. A ceramic dielectric body consisting of 98 to 16 mole percent barium titanate and 2 to 4 mole percent nickel stannate.

3. A ceramic dielectric body consisting of 97 mole percent barium titanate and 3 mole percent nickel stannate.

References Cited in the file of this patent

UNITED STATES PATENTS

| | | |
|---|---|---|
| 2,402,515 | Wainer | June 18, 1946 |
| 2,624,709 | Coffeen | Jan. 6, 1953 |
| 2,658,833 | Coffeen et al. | Nov. 10, 1953 |